(12) United States Patent
Iwanami et al.

(10) Patent No.: US 7,028,475 B2
(45) Date of Patent: Apr. 18, 2006

(54) FLUID MACHINE

(75) Inventors: Shigeki Iwanami, Okazaki (JP);
Yasushi Suzuki, Chiryu (JP); Keiichi Uno, Kariya (JP); Kazuhide Uchida, Hamamatsu (JP); Tadashi Hotta, Okazaki (JP); Hironori Asa, Okazaki (JP); Yasuhiro Takeuchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/844,329

(22) Filed: May 13, 2004

(65) Prior Publication Data

US 2004/0231331 A1    Nov. 25, 2004

(30) Foreign Application Priority Data

May 20, 2003 (JP) .............................. 2003-141556
Feb. 26, 2004 (JP) .............................. 2004-051545

(51) Int. Cl.
*F02G 1/00* (2006.01)
(52) U.S. Cl. ...................................... 60/597; 60/605.1
(58) Field of Classification Search ................. 60/597, 60/605.1
See application file for complete search history.

(56) References Cited

U.S. PATENT DOCUMENTS

| | | | | |
|---|---|---|---|---|
| 3,667,214 A | * | 6/1972 | Addie | .......................... 60/608 |
| 4,924,674 A | * | 5/1990 | Hara et al. | .................... 60/608 |
| 4,932,211 A | * | 6/1990 | Buthmann et al. | ............. 60/607 |
| 5,172,753 A | * | 12/1992 | Kadle et al. | .................... 165/42 |
| 5,579,640 A | * | 12/1996 | Gray et al. | .................... 60/413 |
| 5,870,894 A | * | 2/1999 | Woollenweber et al. | ...... 60/607 |
| 6,408,832 B1 | * | 6/2002 | Christiansen | ............... 123/563 |
| 6,609,897 B1 | | 8/2003 | Nakane et al. | |
| 6,644,932 B1 | | 11/2003 | Kelm et al. | |
| 6,675,596 B1 | | 1/2004 | Iwanami et al. | |
| 2003/0115877 A1 | | 6/2003 | Bara et al. | |

FOREIGN PATENT DOCUMENTS

| | | |
|---|---|---|
| JP | A-S63-96449 | 4/1988 |
| JP | A-H11-287182 | 10/1999 |

OTHER PUBLICATIONS

U.S. Appl. No. 10/764,534, Jan. 27, 2004, Iwanami et al.

* cited by examiner

*Primary Examiner*—Hoang Nguyen
(74) *Attorney, Agent, or Firm*—Posz Law Group, PLC

(57) ABSTRACT

A fluid machine according to the present invention has an expansion-and-compressor device selectively operating as an expansion device for collecting waste heat from an internal combustion engine and converting the collected heat energy into mechanical rotational force, and as a compressor device for compressing refrigerant for a refrigerating cycle for air conditioner. The fluid machine further comprises an electric rotating device selectively operating as an electric power generator and as an electric motor. A power transmission device is further provided between the expansion-and-compressor device and the electric rotating device for selectively transmitting the rotational force from the expansion-and-compressor device to the electric rotating device and vice versa. The power transmission device is composed of a planetary gear train so that it can change rotational speed to be transmitted to the expansion-and-compressor device or to the electric rotating device. Accordingly, the expansion-and-compressor device as well as the electric rotating device can be operated at their most efficient rotational speed.

17 Claims, 3 Drawing Sheets

FLUID MACHINE

CROSS REFERENCE TO RELATED APPLICATION

This application is based on Japanese. Patent Application Nos. 2003-141556 filed on May 20, 2003 and 2004-51545 filed on Feb. 26, 2004, the disclosures of which are incorporated herein by reference.

FIELD OF THE INVENTION

The present invention relates to a fluid machine for collecting waste heat from an internal combustion engine and converting the collected heat energy into mechanical rotational force. The fluid machine comprises an expansion device for collecting the heat energy in a Rankine cycle and generating the rotational force, wherein the expansion device is also used as a compressor device for compressing refrigerant for refrigerating cycle for automotive air conditioner.

BACKGROUND OF THE INVENTION

In a prior art fluid machine, for example shown in Japanese (Non-examined) Patent Publication S63-96449, heat energy is collected by Rankine cycle, wherein a compressor is also used as an expansion device for converting the collected heat energy into mechanical rotational force.

The compressor sucks liquid-phase working fluid into a working chamber thereof and compresses the working fluid by decreasing the volume of the working chamber as a result of applying mechanical force from the outside, whereas the expansion device generates mechanical force by expanding the high pressure and superheated working fluid in the working chamber. As above, when the compressor is also used as the expansion device, the flow of the working fluid should be reversed.

In the above prior art technology, namely in a fluid machine having functions of an expansion and compressor device, an inlet port of the working fluid in an operation of the heat collecting cycle and an inlet port of the working fluid in an operation of the refrigerating cycle are located on the same side, and an outlet port of the working fluid in the operation of the heat collecting cycle and an outlet port of the working fluid in the operation of the refrigerating cycle are located on the same opposite side. Accordingly, the fluid machine of the above prior art is complicated in its construction and becomes larger in its size.

The applicant of the present invention proposed in its prior Japanese patent application No. 2003-19139 (which is also filed in USPTO and EPO, the filing numbers of which are not yet given) a new fluid machine, in which a pair of fluid ports is formed for the fluid machine and one of the ports is used as an inlet port for the heat collecting cycle and an outlet port for the refrigerating cycle, whereas the other port is likewise used as an outlet port for the heat collecting cycle and as an inlet port for the refrigerating cycle, so that the fluid machine would become simpler in its construction and smaller in its size. In the fluid machine of this prior patent application, an electric rotating device is operatively connected to an expansion-and-compressor device. As understood from this prior patent application, a rotational force is directly transmitted (without a speed increase or decrease gear) from the electric rotating device to the expansion-and-compressor device and vice versa.

A rotational speed at which the expansion device is operated with its maximum efficiency and a rotational speed at which the electric rotating device is operated with its highest efficiency are not always the same to each other. In view of this point, it is more preferable to operate the expansion device and the electric rotating device at different rotational speeds, at which those devices can be respectively operated with much higher efficiency.

In another prior art, as shown in US Patent Application Publication No. 2003/0115877 A1, an expansion device is operatively connected to an electric rotating machine via a power transmitting mechanism. It is, however, not disclosed in this prior art how to construct the expansion device, the electric rotating machine and the power transmitting mechanism to achieve a fluid machine of a simpler construction and small in size.

SUMMARY OF THE INVENTION

It is, therefore, an object of the present invention, in view of the above mentioned problems, to provide a fluid machine which is simple in its construction and smaller in its size, and an expansion device and an electric rotating device of which can be respectively operated at their maximum efficiency.

A fluid machine according to the present invention has an expansion-and-compressor device selectively operating as an expansion device for collecting waste heat from an internal combustion engine and converting the collected heat energy into mechanical rotational force, and as a compressor device for compressing refrigerant for a refrigerating cycle for air conditioner. The fluid machine further comprises an electric rotating device selectively operating as an electric power generator and as an electric motor. A power transmission device is further provided between the expansion-and-compressor device and the electric rotating device for selectively transmitting the rotational force from the expansion-and-compressor device to the electric rotating device and vice versa. The expansion-and-compressor device, the electric rotating device and the power transmission device are integrally housed in a fluid housing, so that the fluid machine has simpler construction and smaller size.

According to another feature of the present invention, the power transmission device is composed of a planetary gear train so that it can change rotational speed to be transmitted to the expansion-and-compressor device or to the electric rotating device. Accordingly, the expansion-and-compressor device as well as the electric rotating device can be operated at their most efficient rotational speed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

A first embodiment of the present invention will now be explained with reference to FIGS. 1 through 3. A fluid machine of the present invention is used to, for example, a motor vehicle, which is equipped with an air-conditioning system and a waste heat utilizing system. The waste heat utilizing system is composed of a Rankine cycle, which collects waste heat from an internal combustion engine for generating a running power for the motor vehicle. In addition, in the fluid machine of the present invention, the heat generated by the fluid machine is utilized for performing an air-conditioning operation for the motor vehicle.

Figure 1:
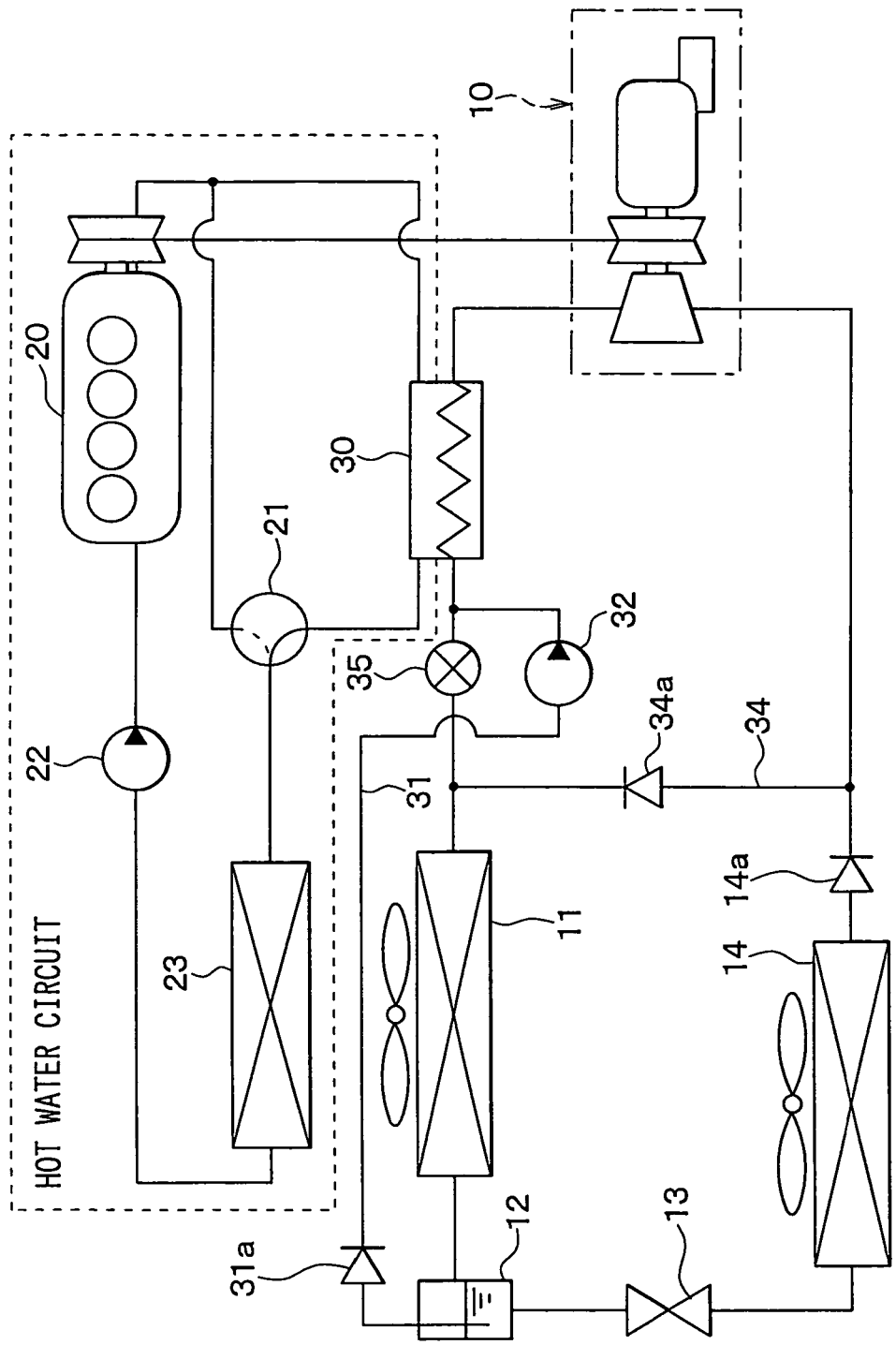
FIG. 1 is a schematic diagram showing a refrigerating cycle and a waste heat collecting cycle to which a fluid machine according to the present invention is applied.

In FIG. 1, a reference numeral 10 designates a fluid machine comprising an expansion-and-compressor device, so that the fluid machine operates as a compressor for compressing a gas-phase refrigerant (this is referred to as a pump mode operation) and also as a power generator for generating a mechanical driving force by converting fluid pressure of superheated steam into kinetic-energy (this is referred to as a motor mode operation). A reference numeral 11 designates a heat radiating device connected to an outlet side of the fluid machine 10 for cooling down the refrigerant gas by heat radiation (The heat radiating device 11 will be also referred to as a condenser).

A reference numeral 12 designates a receiver for dividing the refrigerant from the condenser 11 into a gas-phase refrigerant and a liquid-phase refrigerant. A reference numeral 13 is an expansion valve of a temperature-dependent type for expanding and decreasing the pressure of the liquid-phase refrigerant from the receiver 12, more particularly for decreasing the pressure of the refrigerant in an isenthalpic manner and controlling an opening degree of a passage for the refrigerant so that the degree of superheat of the refrigerant to be sucked into the fluid machine 10 will be maintained at a predetermined value when the fluid machine 10 is operating in the pump mode operation.

A reference numeral 14 designates a heat absorbing device (also referred to as an evaporator) for evaporating the refrigerant from the expansion valve 13 and thereby absorbing heat. The above fluid machine 10, the condenser 11, the receiver 12, the expansion valve 13 and the evaporator 14 constitute a refrigerating cycle.

A heating device 30 is disposed in a refrigerant passage connected between the fluid machine 10 and the condenser 11 and heats the refrigerant flowing through the refrigerant passage by heat-exchanging the refrigerant with engine cooling water flowing through the heating device 30. A switching valve 21 of a three-way valve is provided in a circuit for the engine cooling water, so that the flow of the cooling water through the heating device 30 is switched on and off.

A first by-pass passage 31 is connected between the receiver 12 and the heating device 30 so that the liquid-phase refrigerant will flow from the receiver 12 to an inlet side of the heating device 30 when a liquid pump 32 is operated. A check valve 31a is provided in this first by-pass passage so the only the flow of the refrigerant from the receiver 12 to the heating device 30 is allowed. The liquid pump 32 in this embodiment is an electrically driven pump.

A second by-pass passage 34 is connected between the outlet side of the fluid machine 10 and the inlet side of the condenser 11 and a check valve 34a is disposed in this passage, so that the refrigerant is allowed to flow from the fluid machine 10 to the condenser 11, only when the fluid machine 10 is operated in the motor mode operation.

A check valve 14a is provided in the refrigerating cycle so that the refrigerant is allowed to flow from the outlet side of the evaporator 14 to the inlet side of the fluid machine 10 when the fluid machine 10 is operated in the pump mode operation. An ON-OFF valve 35 is an electromagnetic type for opening and closing the passage for the refrigerant cycle, wherein the valve 35 and the switching valve 21 are controlled by an electronic control unit (not shown).

A water pump 22 circulates the engine cooling water, and a radiator 23 is a heat exchanger for heat-exchanging the heat of the engine cooling water with the ambient air to cool down the engine cooling water. A by-pass passage for by-passing the radiator 23 and a valve for controlling an amount of the engine cooling water flowing through the radiator 23 are omitted in FIG. 1.

The water pump 23 is a mechanical type pump driven by the engine 20 in this embodiment. It is, however, possible to replace it with an electric type pump operated with an electric motor.

Now, the fluid machine 10 will be explained with reference to FIG. 2. The fluid machine 10 according to the embodiment comprises the expansion-and-compressor device 100 for selectively expanding or compressing the refrigerant (the liquid-phase refrigerant in this embodiment), an electric rotating device 200 for generating an electric power when a rotational force is applied thereto and for generating a rotational force when the electric power is applied thereto, an electromagnetic clutch 300 for controlling (switching on and off) a drive train of a rotational force from the engine 20 to the expansion-and-compressor device 100, and a transmission device 400 comprising a planetary gear drive for changing a path for the drive train among the expansion-and-compressor device 100, the electric rotating device 200 and the electromagnetic clutch 300 and for increasing and decreasing the rotational speed to be transmitted.

The electric rotating device 200 comprises a stator 210 and a rotor 220 rotating within a space of the stator 210, wherein a winding is wound on the stator 210 and a permanent magnet is fixed to the rotor 220.

When the electric power is supplied to the stator 210, the rotor 220 will be rotated to operate as an electric motor so that it drives the expansion-and-compressor device 100, whereas it will operate as an electric power generator when a rotational force is applied to the rotor 220.

The electromagnetic clutch 300 comprises a pulley 310 to be connected to the engine 20 via a V-belt, an electromagnetic coil 320 and a friction plate 330 which will be displaced by an electromagnetic force generated at the electromagnetic coil 320 when it is energized. The coil 320 will be energized when the rotational force from the engine 20 will be transmitted to the fluid machine 10, and the supply of the electric power to the coil 320 will be cut off when the transmission of the rotational force shall be cut off.

The expansion-and-compressor device 100 has the same construction to a well known scroll type compressor, and comprises a middle housing 101 fixed to a stator housing 230 of the electric rotating device 200, a fixed scroll 102 connected to the middle housing 101, and a movable scroll 103 disposed in a space defined by the middle housing 101 and the fixed housing 102. The movable scroll 103 is rotated in the space with an orbit motion to form multiple working chambers V. The device 100 further comprises a high pressure chamber 104, passages 105 and 106 operatively communicating the working chamber V with the high pressure chamber 104, and a valve mechanism 107 for controlling an opening and closing of the passage 106.

The fixed scroll 102 comprises a base plate 102a and a spiral scroll wrap 102b protruding from the base plate 102a towards the middle housing 101, whereas the movable scroll likewise has a base plate 103a and a spiral scroll wrap 103b protruding from the base plate 103a towards the fixed scroll, wherein wall portions of the spiral scroll wraps 102b and 103b are contacted with each other to form the working chambers V. When the movable scroll 103 is rotated, the space of the working chamber V will be expanded or decreased.

A shaft 108 is rotationally supported by the middle housing 101 and provided with an internal gear 401, which is a part of the transmission device 400. The shaft 108 is further provided with an eccentric shaft 108a which is eccentric from a rotational axis of the shaft 108 to operate as a crank arm and operatively connected to the movable scroll 103 over a bush 103d and a bearing 103c.

The bush 103d is connected to the eccentric shaft 108a in such a way that the bush 103d can be displaced by a certain small distance in a plain perpendicular to the axis of the eccentric shaft 108a, so that the movable scroll 103 will be displaced in a direction that contact pressure between the scroll wraps 102b and 103b will be increased by means of a reaction force for compression.

A reference numeral 109 designates an autorotation preventing mechanism for preventing the autorotation of the movable scroll 103 and allowing the orbital motion thereof. When the shaft 108 is rotated by one revolution, the movable scroll 103 is moved around the shaft 108 with the orbital motion, and the volume of the working chamber V will be decreased as the working chamber is moved from the outer position to the inner position. The mechanism 109 here comprises a ring and a pair of pins.

The passage 105 operates as an outlet port for pumping out the pressurized refrigerant by communicating the working chamber V, which will reach its minimum volume during the pump mode operation, with the high pressure chamber 104, whereas the passage 106 operates an inlet port for introducing high-temperature and high-pressure refrigerant, namely superheated steam of the refrigerant, from the high pressure chamber 104 into the working chamber V, the volume of which becomes at its minimum value during the motor mode operation.

The high pressure chamber 104 has a function of equalizing the pressure of the refrigerant by smoothing pulsation of the pumped out refrigerant. A high pressure port 110 is formed in a housing forming the high pressure chamber 104 and the port 110 is connected to the heating device 30 and the heat radiating device 11.

A low pressure port 111 is formed in the stator housing 230 for communicating a space defined by the stator housing 230 and the fixed scroll 102 with the evaporator 14 and the second by-pass passage 34.

A discharge valve 107a and a valve stopper 107b are fixed to the base plate 102a of the fixed scroll 102 by a bolt 107c, wherein the valve 107a is a check valve of a reed valve type for preventing the pumped out refrigerant from flowing back to the working chamber V from the high pressure chamber 104, and the stopper 107b is a plate for limiting the movement of the reed valve 107a.

A spool 107d is a valve for opening and closing the inlet port 106, an electromagnetic valve 107e is a control valve for controlling pressure in a back pressure chamber 107f by opening and closing a passage between back pressure chamber 107f and the high pressure chamber 104 or the space communicated with the low pressure port 111. A spring 107g is disposed in the back pressure chamber 107f to urge the spool 107d in a direction to close the inlet port 106, and an orifice 107h having a certain flow resistance is formed in the passage connecting the high pressure chamber 104 with the back pressure chamber 107f.

When the electromagnetic valve 107e is opened, the back pressure chamber 107f is communicated to the space defined by the stator housing 230 (the lower pressure side), then the pressure in the back pressure chamber 107f will be decreased lower than that in the high pressure chamber 104 and finally the spool 107d will be moved against the spring force of the spring 107g in a direction to open the inlet port 106. Since the pressure drop at the orifice 107h is so high that an amount of the refrigerant flowing from the high pressure chamber 104 into the back pressure chamber 107f is negligible small.

On the other hand, when the electromagnetic valve 107e is closed, the pressure in the back pressure chamber 107f becomes equal to that in the high pressure chamber 104 and then the spool 107d will be moved in the direction to close the inlet port 106. As above, the spool 107d, the electromagnetic valve 107e, the back pressure chamber 107f and the orifice 107h constitute a pilot-type electric valve for opening and closing the inlet port 106.

The transmission device 400 comprises the ring shape internal gear 401 (ring gear), multiple (e.g. three) planetary gears 402 being engaged with the ring gear 401, and a sun gear 403 being engaged with the planetary gears 402.

The sun gear 403 is integrally formed with the rotor 220 of the electric rotating device 200 and the planetary gears 402 are integrally fixed to a shaft 331 to which a friction plate 330 is connected.

A one-way clutch 500 transmits a rotational force from the pulley 310 to the shaft 331, a bearing 332 rotationally supports the shaft 331, a bearing 404 rotationally supports the sun gear 403, namely the rotor 220 with respect to the shaft 331, a bearing 405 rotationally supports the internal gear 401 with respect to the shaft 108, and a bearing 108c rotationally supports the shaft 108 with respect to the middle housing 101.

A rip seal 333 is a seal for preventing the refrigerant from flowing out through a gap between the shaft 331 and the stator housing 230.

In this embodiment, the transmission device 400 and the electric rotating device 200 are disposed in the stator housing 230. Further, the stator housing 230, the middle housing 101 and the fixed scroll 102 are integrally fixed to each other, and those elements constitute an outer frame of the fluid machine. The middle housing 101 divides the inside space of the fluid machine into the space defined by the stator housing 230 and the space defined by the fixed scroll 102 for the expansion-and-compressor device 100.

Figure 2:
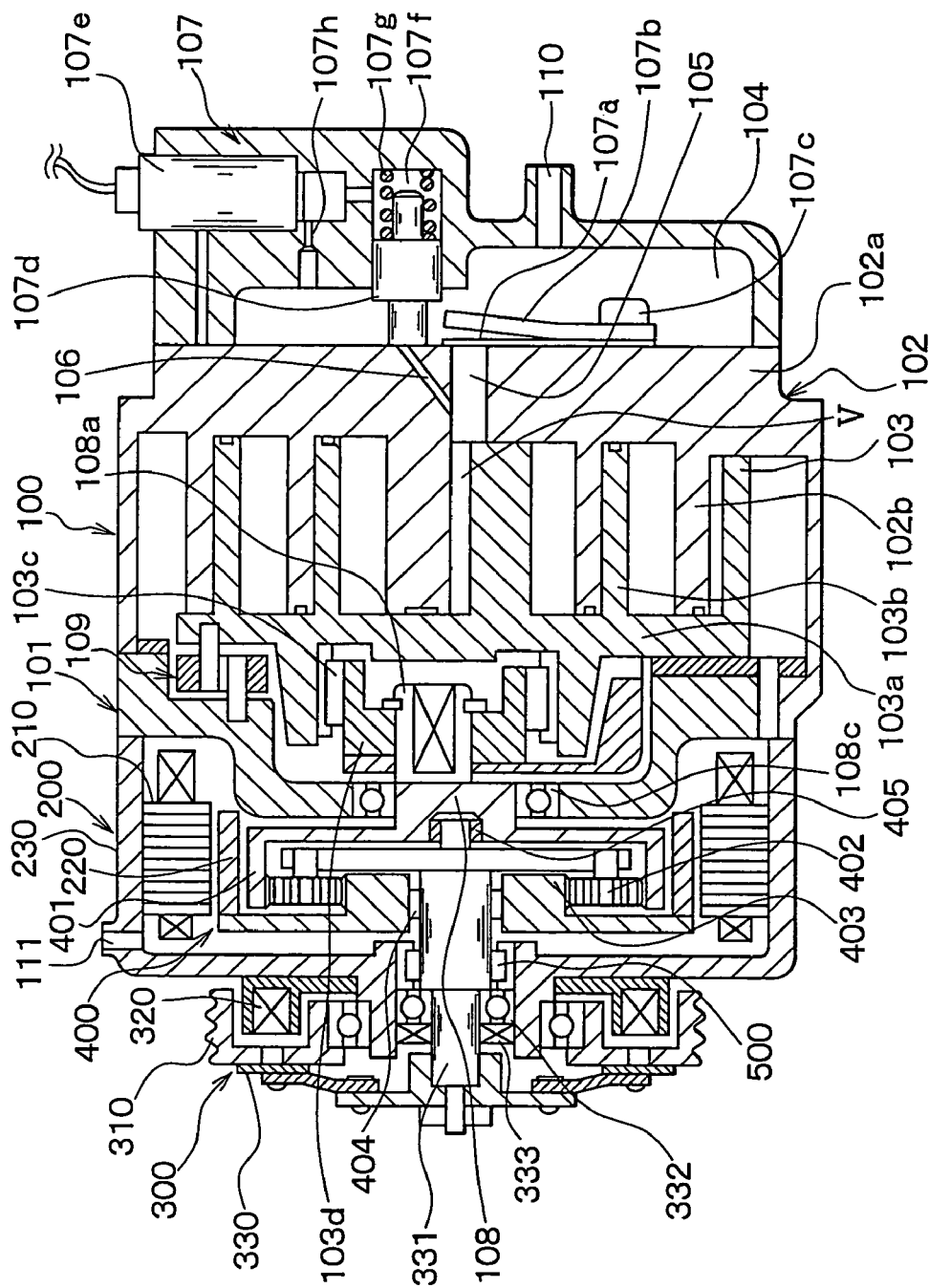
FIG. 2 is a cross-sectional view of a fluid machine according to a first embodiment of the present invention.
Figure 3:
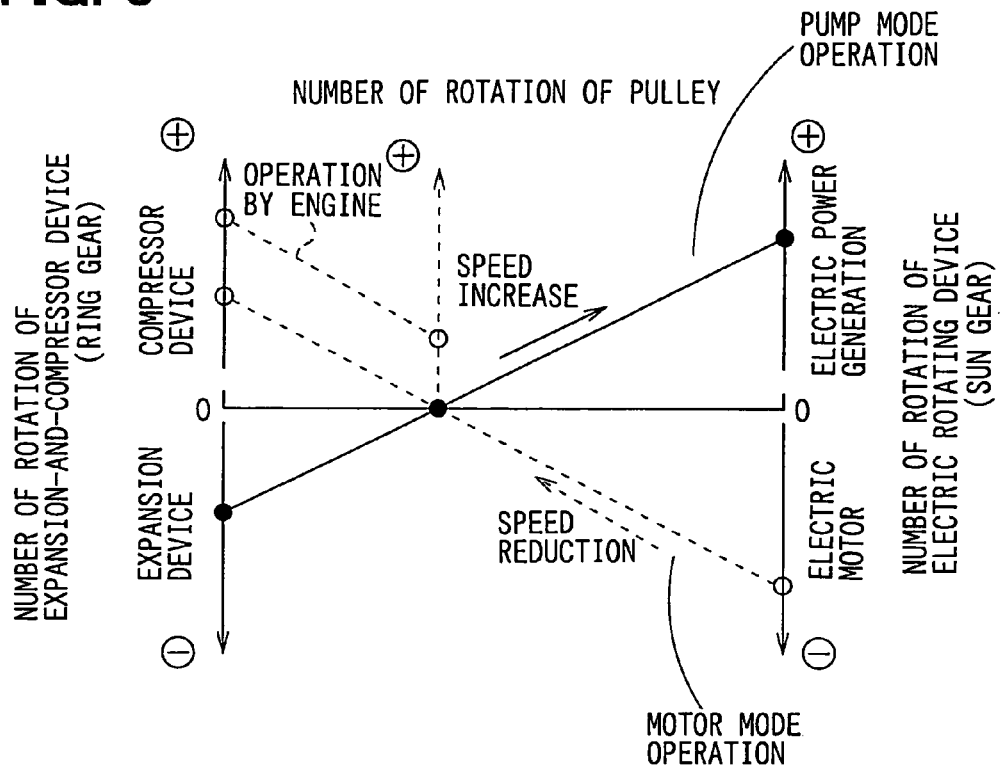
FIG. 3 is a chart showing an operation of the fluid machine according to the first embodiment.

As understood from FIG. 2, the expansion-and-compressor device 100, the electric rotating device 200 and the electromagnetic clutch 300 are arranged in alignment with each other.

Now, an operation of the fluid machine as described above will be explained.

(Pump Mode Operation)

The pump mode operation is the operation in which a rotational force is applied to the shaft 108 and the expansion-and-compressor device 100 is thereby operated to compress the refrigerant by rotating the movable scroll 103 with the orbit motion. In this operation, the expansion-and-compressor device 100 is also referred to as the compressor device 100.

In this pump mode operation, the electromagnetic valve 107e is closed and thereby the inlet port 106 is closed. When the shaft 108 and the movable scroll 103 are rotated, the device 100 sucks the refrigerant from the low pressure port 111, compresses the refrigerant by the working chamber V, pumps out the pressurized refrigerant to the high pressure chamber 104 through the outlet port 105, and finally discharges the high pressure refrigerant to the heat radiating device (condenser) 11 through the high pressure port 110. The refrigerant from the low pressure port 111 flows through the inside of the stator housing 230 and flows into the device 100.

In this operation, there are two methods for applying the rotational force to the shaft 108, namely one of them is a method in which the supply of the electric power to the electromagnetic clutch 300 is cut off and thereby the compressor device 100 is mechanically disconnected from the pulley 310 and then the electric rotating device 200 is operated as the electric motor by supplying the electric power thereto so that the rotational force of the device 200 will be applied to the compressor device 100. In the other method, the compressor device 100 is mechanically connected to the engine 20 over the electromagnetic clutch 300, and the driving force from the engine 20 is applied to the compressor device 100.

In this operation, since the planetary carrier is not rotated because of the one-way clutch 500, the rotational force of the electric rotating device 200 will be transmitted to the compressor device 100 through the transmission device 400 with the rotational speed being reduced thereby.

In the case that the electromagnetic clutch 300 is supplied with the electric power to mechanically connect the compressor device 100 with the engine 20 to transmit the rotational force from the engine 20 to the compressor device 100, the electric power is also supplied to the electric rotating device 200 to generate electromagnetic force at the stator and thereby to apply a torque to the rotor 220 so that the sun gear 403 and the rotor 220 may not be rotated.

As a result, the rotational force transmitted from the engine 20 to the electromagnetic clutch 300 will be further transmitted to the compressor device 100 through the transmission device 400 with the rotational speed being increased thereby.

(Motor Mode Operation)

The motor mode operation is the operation in which high pressure and superheated steam of the refrigerant, which is superheated by the heating device 30, is introduced into the expansion-and-compressor device 100 and the refrigerant is expanded in the working chamber V, so that a rotational force is generated by rotating the movable scroll 103 with the orbit motion in the different rotational direction to that for the pump mode operation. In this operation, the expansion-and-compressor device 100 is also referred to as the expansion device 100.

The rotational force generated at the expansion device 100 is used for rotating the rotor 220 to generate the electric power at the electric rotating device 200, and the electric power will be charged into a battery.

More in detail, the supply of the electric power to the electromagnetic clutch 300 is cut off and the electromagnetic valve 107e is opened so that the inlet port 106 is also opened. Then the high pressure and superheated refrigerant heated by the heating device 30 will be introduced into the working chamber V through the inlet port 106 and the superheated refrigerant will be expanded in the working chamber V.

The movable scroll 103 will be rotated in the reversed direction to that of the pump mode operation by the expansion of the superheated steam. The rotational energy given to the movable scroll 103 is transmitted to the rotor 220 of the electric rotating device 200 through the transmission device 400 with the rotational speed being increased thereby. The refrigerant gas, the pressure of which is reduced after the expansion, flows out through the low pressure port 111 to the heat radiating device 11. FIG. 3 shows a diagram explaining the above mentioned operation.

An operation of the refrigerating cycle and the waste heat collecting cycle will be explained.

(Air-Conditioning Operational Mode)

The air-conditioning operational mode is an operational mode in which air is cooled down at the evaporator 14 and the heat of the refrigerant is radiated at the condenser 11.

In this operational mode, the operation of the liquid pump 32 is stopped, the ON-OFF valve 35 is opened and the device 100 is operated as the compressor device (pump mode operation). And the engine cooling water is circulated by by-passing the heating device 30 by means of the switching valve 21.

The refrigerant flows in this operational mode from and back to the compressor device 100 through the heating device 30, heat radiating device 11 (condenser), the receiver 12, the expansion valve 13, and the evaporator 14. In this flow of the refrigerant, the refrigerant will not be heated by the heating device 30 since the engine cooling water is flowing by by-passing it.

The low pressure refrigerant, which is decompressed at the expansion valve 13, will be evaporated at the evaporator 14 by absorbing the heat from the air flowing through the evaporator 14 and the cooled down air will be blown out into a passenger room of the motor vehicle. The evaporated gas-phase refrigerant will be again compressed by the compressor device 100 and the high temperature compressed refrigerant is then cooled down and condensed at the condenser 11.

Although Freon (HFC134a) is used as the refrigerant (working fluid) in this embodiment, any other refrigerant which will be liquidized at a higher pressure side can be used (not limited to HFC134a).

(Waste Heat Collecting Operational Mode)

This is an operational mode in which the operation of the air-conditioning is stopped, namely the operation of the compressor device 100 is stopped, and instead the waste heat from the engine 20 is collected and converted to mechanical energy.

In this operational mode, the liquid pump 32 is operated, the ON-OFF valve 35 is closed and the device 100 is operated as the expansion device (motor mode operation). And the engine cooling water is circulated through the heating device 30 by means of the switching valve 21.

The refrigerant flows in this operational mode from and back to the expansion device 100 through the second by-pass passage 34, heat radiating device 11, the receiver 12, the first by-pass passage 31, the pump 32 and the heating device 30. The flow of the refrigerant in the heat radiating device 11 is different from that for the pump mode operation.

As above, the superheated steam heated by the heating device 30 flows into the expansion device 100 and expanded therein so that the enthalpy of the refrigerant will be decreased in an isentropic manner. Accordingly, the electric power corresponding to an amount of decrease of the enthalpy will be charged into the battery.

The refrigerant from the expansion device 100 will be cooled down and condensed at the heat radiating device 11 and charged in the receiver 12. Then the liquid-phase refrigerant will be sucked from the receiver 12 by the liquid pump 32 and pumped out to the heating device 30. The liquid pump 32 pumps out the liquid-phase refrigerant at such a pressure that superheated steam at the heating device 30 may not-flow in a backward direction.

The above described embodiment has the following effects and advantages.

(1) The waste heat can be efficiently collected to generate electric power by means of the transmission device 400, even when the rotational speed of the expansion device 100 at which the waste heat can be most efficiently collected and the rotational speed of the electric rotating device 200 at which the electric power can be most efficiently generated are different from each other.

(2) The expansion-and-compressor device 100 can be efficiently operated as the expansion device and as the compressor device, even when the volume of the working chamber at which the waste heat can be efficiently collected and the volume of the working chamber at which the refrigerant can be efficiently compressed are different from each other.

(3) The fluid machine can be made with a simple construction and low in cost, since the expansion-and-compressor device 100, the transmission device 400, the electric rotating device 200 and the electromagnetic clutch 300 are arranged in alignment with each other and those devices are integrally housed by and in the middle housing 101, the fixed scroll 102 and the stator housing 230. The fluid machine can perform its functions at a high reliability, because a path for transmitting the rotational driving force is formed in a simple manner.

Furthermore, workability for assembling and disassembling (for the purpose of repairing) of the fluid machine can be improved. It becomes, further, easier to manufacture those various devices as a module system (one unit combining a plurality of devices) or to create standards.

(4) The reliability and durability of the fluid machine can be increased. The stator housing 230, housing therein the transmission device 400 and the electric rotating device 200, and the expansion-and-compressor device 100 are separated by the middle housing 101. A thrust load appears at the movable scroll 103 due to high pressure of the refrigerant in the working chamber V. This thrust load is received at the middle housing and will not be applied to the shaft 108 and the bearing 108c.

(5) The fluid machine operates with a higher lubrication performance, since the refrigerant flows from the lower pressure port 111 to the expansion-and-compressor device 100 through the inside of the stator housing 230 in the pump mode operation. Since lubricating agent is included in the refrigerant, the gears 401, 402 and 403 of the transmission device 400 are lubed by the flow of the refrigerant.

Furthermore, heat generated at the electric rotating device 200 can be absorbed by the refrigerant.

(6) The durability of parts for the fluid machine can be also prolonged. The electromagnetic clutch 300 connects and disconnects the driving force from the engine 20 to and from the electric rotating device 200. And thereby the electromagnetic clutch 300 and the pulley 310 and other parts may not be uselessly rotated, so that it decreases mechanical loss to be caused by the rotation to prolong the life of those parts.

(7) The fluid machine can be made in a smaller size. The rotation of the sun gear 403 can be stopped by supplying the electric power to the electric rotating device 200, which leads to an advantage in that any special braking means, such as an electromagnetic brake, a mechanical brake an so on, is not necessary. It is, of course, further advantageous that the cost for manufacturing the fluid machine becomes lower.

(8) The compression volume of the expansion-and-compressor device 100 can be enlarged without making other devices or parts larger. This is because that the rotational driving force from the engine 20 is transmitted from the electromagnetic clutch 300 to the compressor device 100 through the transmission device 400 with the rotational speed being increased.

(9) The structure and size of the fluid machine, in particular the electric rotating device 200 can be made simpler and smaller, since the rotor 220 and-the sun gear 403 are integrally formed as one unit. When the rotor 220 is rotated in a forward direction, it works as a part of the transmission device 400 and when it is rotated in the reverse direction, it works as the rotor for the electric rotating (generating) device 200.

(Second Embodiment)

Figure 4:
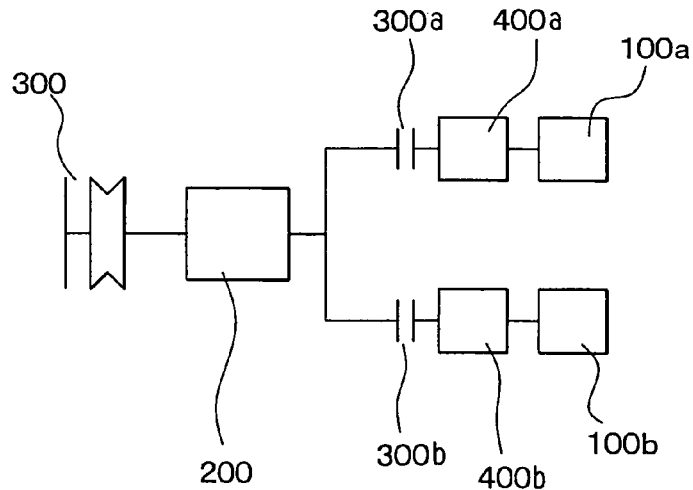
FIG. 4 is a schematic diagram showing a fluid machine according to a second embodiment of the present invention.

In the above first embodiment, the single device 100 is commonly used as the expansion device and the compressor device. According to the second embodiment, however, a compressor device 100a and an expansion device 100b are separately provided, as shown in FIG. 4. And furthermore, in the second embodiment, a transmission device 400a for transmitting the rotational force from the engine 20 or from the electric rotating device 200 to the compressor device 100a with the rotational speed being decreased and another transmission device 400b for transmitting the rotational force from the expansion device 100b to the electric rotating device 200 with the rotational speed being increased are respectively provided.

Reference numerals 300a and 300b designate power transmitters, such as an electromagnetic clutch, for mechanically connecting or disconnecting the transmission of the rotational force.

(Other Embodiments)

The transmission device 400 of the planetary gear train can be replaced by any kinds of other transmission devices, such as CVT (Continuous Variable Transmission), or a toroidal-type transmission without using belts, and the like.

The expansion-and-compressor device 100 of the scroll type can be also replaced by any other type of expansion and compressor devices, such as a rotary type, a piston type, a vane type and so on.

Although the collected waste heat energy from the engine is converted into the electric power by the expansion-and-compressor device 100 and charged in the battery in the above embodiment, the collected energy can be converted into mechanical energy, for example, into kinetic energy by a flywheel, or into elastic potential energy by springs.

The fluid machine should not be limited to a use for motor vehicles.

What is claimed is:

1. A fluid machine comprising:
a housing;
an expansion-and-compression device having a function of a compressor device for compressing working fluid in a refrigeration cycle when the expansion-and-compression device is driven in a first rotational direction and having a function of an expansion device for collecting heat energy from working fluid in a heat collecting cycle and converting the collected heat energy into mechanical rotational energy, wherein the expansion-and-compression device is rotated in a second rotational direction, which is opposite to the first rotational direction, when operated as the expansion device;

an electric rotating device having a function of an electric motor for outputting the mechanical rotational energy and having a function of an electric power generator for outputting the mechanical rotational energy;

a power transmission means provided in a power transmitting path between the expansion-and-compression device and the electric rotating device for transmitting the mechanical rotational energy from the expansion-and-compression device to the electric rotating device with rotational speed being changed, wherein the expansion-and-compression device, the electric rotating device and the power transmission means are integrally housed in the housing, and the expansion-and-compression device is operatively connected with an outside driving source, so that the expansion-and-compression device is operated as the compressor device by a driving force of the outside driving source.

2. A fluid machine according to claim 1, wherein the expansion-and-compression device converts the heat energy from the working fluid into the mechanical rotational energy by expanding superheated steam of the working fluid so that the enthalpy of the working fluid will be decreased in an isentropic manner.

3. A fluid machine according to claim 1, wherein the power transmission means transmits the mechanical rotational energy from the expansion-and-compression device to the electric rotating device so that the rotational speed is increased.

4. A fluid machine according to claim 1, wherein the electric rotating device is operatively connected to the expansion-and-compression device for generating electric power when it is operated by the mechanical rotational energy from the expansion-and-compression device.

5. A fluid machine comprising:
an expansion-and-compression device having a function of an expansion device for converting heat energy from working fluid into mechanical rotational energy by expanding superheated steam of the working fluid so that the enthalpy of the working fluid will be decreased in an isentropic manner and having a function of a compressor device for drawing the working fluid and compressing the same in a refrigeration cycle, wherein the direction of rotation of the expansion-and-compression device when the expansion-and-compression device acts as the expansion device is opposite to the direction of rotation of the expansion-and-compression device when the expansion-and-compression device acts as the compressor device;

an electric rotating means having a function for generating electric power when the mechanical rotational energy is applied thereto and having a function for generating a rotational force when electric power is supplied thereto; and a power transmission means provided in a power transmitting path between the expansion-and-compression device and the electric rotating means.

6. A fluid machine according to claim 5, wherein the power transmission means transmits the mechanical rotational energy from the expansion-and-compression device to the electric rotating means so that the rotational speed is increased, when the expansion-and-compression device is operated as the expansion device.

7. A fluid machine according to claim 5, wherein the power transmission means transmits the rotational force from the electric rotating means to the expansion-and-compression device so that the rotational speed is decreased, when the expansion-and-compression device is operated as the compressor device.

8. A fluid machine according to claim 5, wherein
the electric rotating means comprises a rotor which is rotated when electromagnetic force is applied thereto; and
the transmission means is arranged within a space formed by the rotor.

9. A fluid machine according to claim 5, further comprising:
an external power transmitting means for transmitting a rotational force from an external power source to the expansion-and-compression device.

10. A fluid machine according to claim 5, further comprising:
a first housing for housing therein the expansion-and-compression device; and
a second housing for housing therein the electric rotating means, wherein the first housing and the second housing are integrally connected to each other.

11. A fluid machine according to claim 10, wherein the working fluid flows through the inside of the second housing when the expansion-and-compression device converts the heat energy of the working fluid into the mechanical rotational energy.

12. A fluid machine according to claim 10, wherein the electric rotating means and power transmission means are housed in the second housing.

13. A fluid machine for a motor vehicle comprising:
a housing;
a pulley rotationally supported by the housing and operatively connected to an internal combustion engine for the motor vehicle;
an electric rotating device housed in the housing and having a function for generating electric power when it is operated as an electric power generator and a function for generating a rotational force when it is operated as an electric motor;
an expansion-and-compression device housed in the housing, wherein the expansion-and-compression device has a function of an expansion device for collecting waste heat from the internal combustion engine and generating a mechanical rotational force from the collected waste heat when it is operated as an expansion device and the expansion-and-compression device has a function of a compressor device for compressing a refrigerant a refrigeration cycle for the motor vehicle when it is operated as a compressor device;
a power transmission device housed in the housing and operatively connected between the electric rotating device and the expansion-and-compression device,
wherein the expansion-and-compression device is further operatively connected to the pulley through the power transmission device, so that the power transmission device transmits a rotational force of the pulley to the expansion-and-compression device when it is operated as the compressor device,
the power transmission device transmits the mechanical rotational force from the expansion-and-compression device to the electric rotating device when the expansion-and-compression device is operated as the expansion device, and the power transmission device further transmits the rotational force generated at the electric rotating device to the expansion-and-compression device when electric rotating device is operated as the electric power generator.

14. A fluid machine according to claim 13, further comprising an electromagnetic clutch provided at the pulley for transmitting the rotational force from the engine to the expansion-and-compression device when the electromagnetic clutch is energized.

15. A fluid machine according to claim 13, wherein the power transmission device is composed of a planetary gear train.

16. A fluid machine according to claim 13, wherein the pulley, the power transmission device, electric rotating device and the expansion-and-compression device are coaxially arranged with each other.

17. A fluid machine according to claim 13, further comprising an intermediate wall provided within the housing for dividing a housing space defined by the housing into two spaces, wherein the expansion-and-compression device is disposed in one of the spaces and the electric rotating device and the power transmission device are disposed in the other of the spaces.

* * * * *